(12) United States Patent
Hori

(10) Patent No.: US 6,342,979 B1
(45) Date of Patent: Jan. 29, 2002

(54) OPTICAL PICKUP AND LENS HOLDER THEREFOR

(75) Inventor: Ken'ichi Hori, Kawasaki (JP)

(73) Assignee: Mitsumi Electric Co., Ltd., Tokyo (JP)

(*) Notice: Subject to any disclaimer, the term of this patent is extended or adjusted under 35 U.S.C. 154(b) by 0 days.

(21) Appl. No.: 09/491,819

(22) Filed: Jan. 26, 2000

(30) Foreign Application Priority Data

Jan. 27, 1999 (JP) .............................. 11-018271

(51) Int. Cl.$^7$ ................................. G02B 7/02
(52) U.S. Cl. .................. 359/819; 359/808; 359/811
(58) Field of Search ..................... 359/819, 811, 359/808, 813, 814, 823, 824; 369/44.11, 44.12, 44.13, 44.14, 44.15, 44.16, 44.17, 44.18, 44.19, 44.21, 44.22, 44.23, 44.24, 44.25, 44.26; 396/529

(56) References Cited

U.S. PATENT DOCUMENTS 5,553,052 A  * 9/1996 Oono et al. ............... 369/112

5,781,351 A    7/1998 Murakami et al. .......... 359/808

FOREIGN PATENT DOCUMENTS

| EP | 0 736 788 A | 10/1996 |
| WO | 95/13904 A | 5/1995 |

* cited by examiner

Primary Examiner—Georgia Epps
Assistant Examiner—Gary O'Neill
(74) Attorney, Agent, or Firm—Frishauf, Holtz, Goodman, Langer & Chick, P.C.

(57) ABSTRACT

There is disclosed a lens holder capable of firmly holding the objective lens of an optical pickup to the holder without contamination of the effective range of the objective lens due to adhesive. An optical pickup using this lens holder is also disclosed. The lens holder 10 has a seat portion 3 for locking the objective lens 1 of the optical pickup. The seat portion 3 has a top-end surface 3a that is inclined and sinks outward.

6 Claims, 6 Drawing Sheets

BONDED SURFACE OF LENS

BONDED SURFACE OF LENS

BONDED SURFACE OF LENS

OPTICAL PICKUP AND LENS HOLDER THEREFOR

BACKGROUND OF THE INVENTION

1. Field of the Invention

The present invention relates to optical pickups for reading and writing information to and from an optical recording medium, such as an optical disk, and to lens holders used in such an optical pickup.

2. Description of the Related Art

Generally, an optical pickup of this kind has a laser light source for emitting a laser beam and optics for guiding the emitted laser beam to a recording medium such as an optical disk. A rewritable recording medium, such as CD-Recordable or CD-Rewritable, permits reading of information, as well as writing of information. With an optical pickup for CD-Recordable, it is necessary to switch the output level of the laser beam emitted from a laser light source, depending on whether information is read or written, for the following reason. To write information, laser beam is radiated to form pits in the recording layer of an optical disk. The output of the laser beam is emitted from the laser light source during writing of information and is higher than the output emitted during reading of information. For example, the former output is about 10 to 20 times as large as the latter output.

An optical pickup used for an optical disk drive, such as a CD recorder, comprises an optical base, a lens holder, a damper base connected to the lens holder via suspension wires, and an actuator base that accommodates both lens holder and damper base. The lens holder is equipped with an objective lens, a tracking coil, and a focusing coil. The actuator is formed integrally with a yoke having a magnet for driving the lens holder by making use of the interaction between the tracking coil and the focusing coil.

The optical pickup has a laser acting as a light source that emits a laser beam. The laser beam emitted from the laser is made to hit an optical disk, such as a CD-R disk, that is an optical recording medium through a diffraction grating, a beam splitter, a collimator lens, and an objective lens. Light reflected from the optical disk impinges on a photodiode (PD) that is a light-receiving device through the objective lens, the collimator lens, and the beam splitter. That is, the photodiode receives the light reflected from the optical disk. Optical parts include the laser and the beam splitter and are held to the optical base.

The lens holder of the objective lens has flat support portions, a seat portion cylindrically protruding from parts of the flat supports, and the aforementioned objective lens installed on the seat portion. The seat portion is provided with crisscross grooves extending diametrically. Claws protrude upward from the grooves.

The optical lens of the optical pickup and the lens holder for holding the pickup are bonded together by placing the objective lens on the flat top-end surface of the seat portion of the lens holder and using an adhesive, such as a UV-curable resin.

If the flat top-end surface of the seat portion on which the objective lens is to be placed is partially concave, the adhesive may soak through the objective lens toward its center. If this adhesive reaches a portion of the objective lens through which light can pass (hereinafter referred to as the effective region of the objective lens), the optical characteristics of the pickup will deteriorate.

SUMMARY OF THE INVENTION

It is an object of the present invention to provide a lens holder capable of firmly holding the objective lens of an optical pickup to the holder via an adhesive without contamination of the effective range of the objective lens due to the adhesive.

It is another object of the invention to provide an optical pickup for use in the lens holder described in the immediately preceding paragraph.

According to one aspect of the present invention, there is provided an optical pick up which has a lens holder on which an objective lens is held, an actuator base, a damper base connected to the actuator base, and suspension wires. The lens holder has a seat portion for locking said objective lens. The seat portion has a top-end surface.

In the aspect of the present invention, an inclined surface is formed in said top-end surface of said seat portion and sinking outward.

According to another aspect of the present invention, there is provides a lens holder which has a seat portion for locking an objective lens of an optical pick up. The seat portion has a top-end surface that is an inclined surface sinking outward.

Other objects and features of the invention will appear in the course of the description thereof, which follows.

DESCRIPTION OF THE PREFERRED EMBODIMENTS

Before describing the preferred embodiments of the present invention, a conventional pickup is described by referring to FIGS. 1–4 to better understand the invention.

Figure 1:
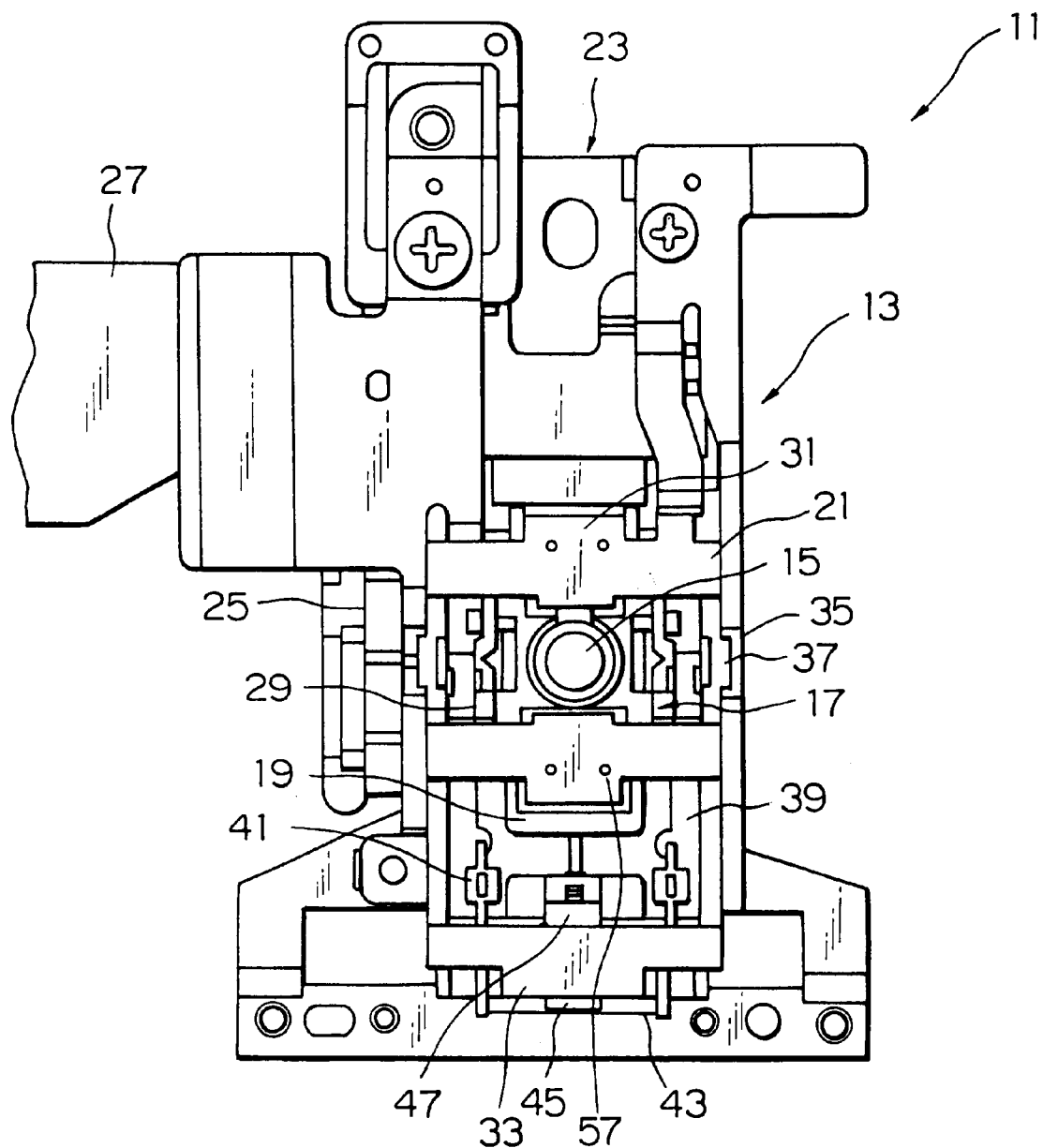
FIG. 1 is a plan view of an optical pickup in the Prior Art.

Referring to FIG. 1, an optical pickup 11 is used in an optical disk drive, such as a CD recorder. The pickup 11 includes an optical base 13, a lens holder 17, a damper base 19, and an actuator base 21. The lens holder 17 is equipped with an objective lens 15, a tracking coil (not shown), and a focusing coil (not shown). The actuator base 21 houses the lens holder 17 and the damper base 19.

The optical pickup 11 has a laser 23 acting as a light source for radiating a laser beam. The laser beam emitted from the laser 23 is directed onto an optical disk (CD-R) disk that is an optical recording medium through a diffraction grating, a beam splitter, and a collimator lens (none of which are shown) and through the objective lens 15. Light reflected from the optical disk hits a photodiode (not shown) that is a light-receiving device through the objective lens 15, the collimator lens, and the beam splitter. That is, the photodiode receives the light reflected from the optical disk.

Optical parts including the laser 23 and the beam splitter are held to the optical base 13, which in turn is securely mounted to the enclosure (not shown) of the optical disk drive. A printed-circuit board 25 is mounted to a side surface of the optical base 13. The printed-circuit board 25 is electrically connected with other electrical parts (not shown) of the optical disk drive via a flexible cable 27 connected with the board 25.

The lens holder 17 and the damper base 19 are connected together by plural suspension wires 29, thus forming a subassembly accommodated in the actuator base 21. A part of the actuator base 21 forms a yoke 31 with which a magnet is combined.

The actuator base 21 comprises a frame molded from a metallic material and has a damper base-receiving portion (not shown) at a side of one end of the frame to receive the damper base 19. A support block 33 for locking the damper base 19 is present in this receiving portion. The support block 33 is molded integrally with the actuator base 21. Substantially semicircular protrusions 37 are formed on both sidewalls of the frame and are held by support portions 35 formed on the optical base 13.

A damper base cover 39 is molded from a transparent resinous material and is mounted to the damper base 19, and has also a rear portion on which fixing portions 41 for anchoring respective one end of the suspension wires 29 are mounted. A vibration-damping material (not shown) is injected in the space between the damper base 19 and the damper base cover 39 to damp vibrations of the suspension wires 29.

A flexible circuit 43 to be soldered to ends of the suspension wires 29 that are located ahead of the fixed ends is mounted on the rear wall of the damper base 19. The damper base 19 is inserted in the space among the sidewalls of the actuator base 21 and the support block 33 and made stationary.

The support block 33 and the damper base 19 are squeezed in between a screw (bolt) 45 and a nut 47. The damper base 19 is rotatable about the screw to permit adjustment of the skew.

Before the damper base 19 is fixedly mounted to the actuator base 21, the suspension wires 29 are mounted to the damper base 19. That is, the lens holder 17 and the damper base 19 are assembled into a unit by the plural suspension wires 29. The resulting unit is received and mounted in the actuator base 21.

Figure 2A:
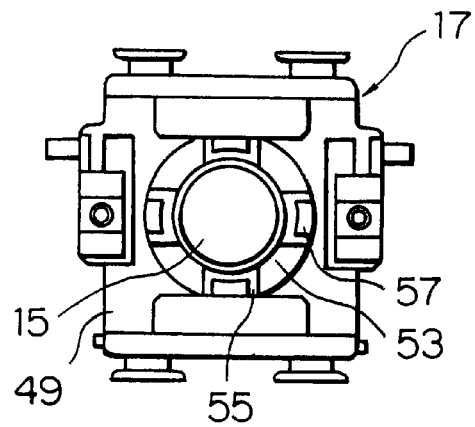
FIG. 2A is a plan view of a lens holder shown in FIG. 1.
Figure 2B:
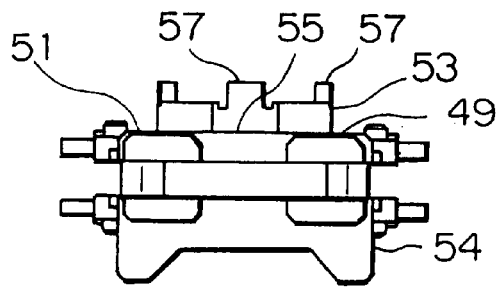
FIG. 2B is a front elevation view of the lens holder shown in FIG. 2A, but in which the lens has been removed.
Figure 2C:
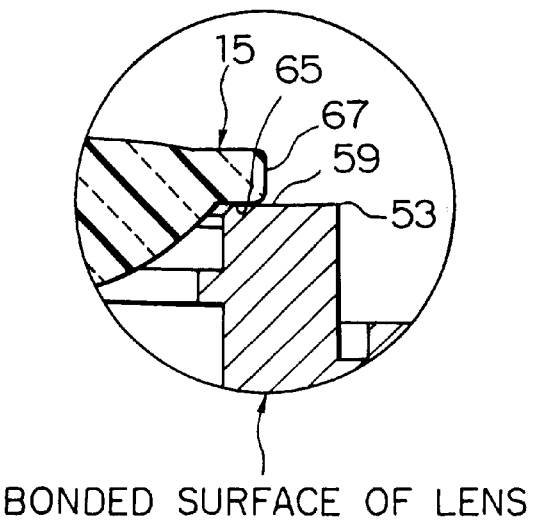
FIG. 2C is a fragmentary enlarged cross sectional view of the bonded surface of a lens shown in FIG. 2A.

Referring to FIGS. 2A, 2B, and 2C, the lens holder 17 of the objective lens has flat support portions 49, 51, a seat portion 53 cylindrically protruding from the support portion 49, and the aforementioned objective lens 15 installed on the seat portion 53. The seat portion 53 is provided with crisscross grooves 55 extending diametrically. Claws 57 protrude upward from the grooves 55.

The objective lens 15 of the optical pickup and the lens holder 17 holding the pickup are fastened together by placing the objective lens 15 on a flat top-end surface 59 of the seat portion 53 of the lens holder 17 and using an adhesive such as a UV-curable resin, as best shown in FIG. 2C. The bottom end surface of the fringing portion of the objective lens, the outer side surface, and the top end surface of the fringing portion of the objective lens are indicated by 65, 67, and 69, respectively.

Figure 3:
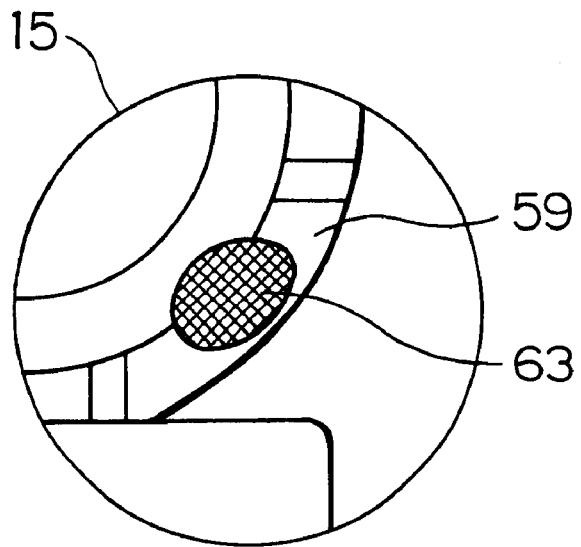
FIG. 3 is a partially plan view illustrating the state of adhesive applied to the prior art lens holder.
Figure 4:
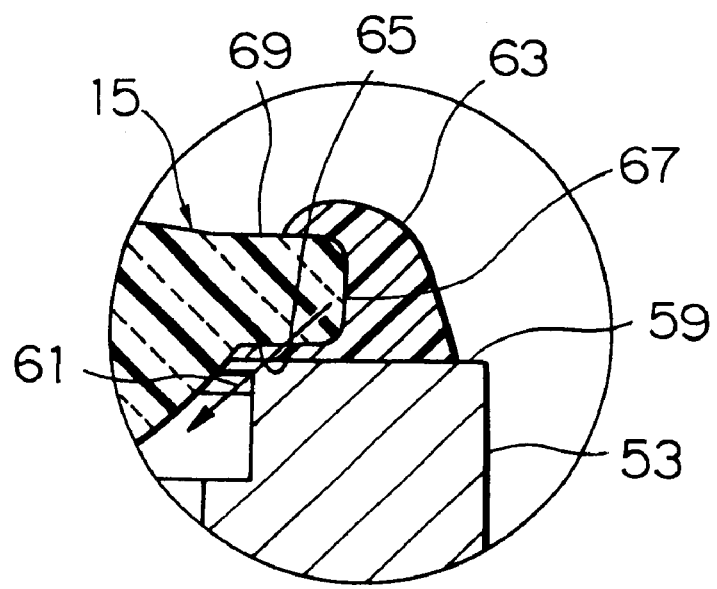
FIG. 4 is a fragmentary enlarged cross sectional view of the adhesively bonded portion of the prior art lens holder.

Referring next to FIGS. 3 and 4, if a gap or recess is present in a part of the flat top-end surface 59 of the seat portion 53 on which the objective lens 15 is placed, adhesive 63 may soak through the objective lens 15 toward its center as indicated by an arrow 61 in FIG. 4. If this adhesive reaches a portion of the objective lens 52 through which light can pass, (hereinafter referred to as the effective region of the objective lens) the optical characteristics of the pickup will deteriorate.

Now description will be made as regards the preferred embodiment of the present invention with reference to FIGS. 5–8.

Figure 5:
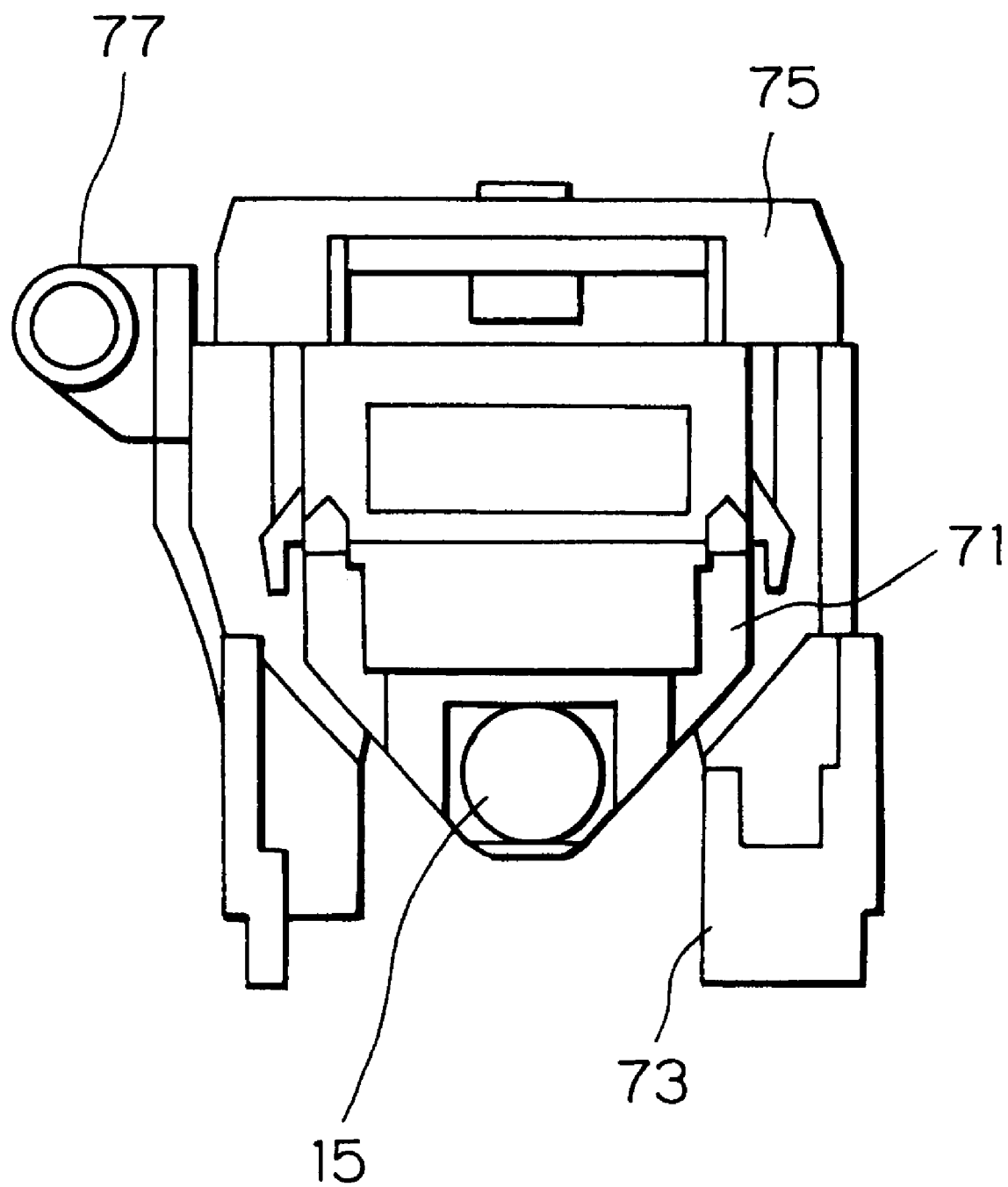
FIG. 5 is a rear view of main portions of an optical pickup in accordance with an embodiment of the invention.

Referring to FIG. 5, an optical pickup is equipped with a lens holder 71, an actuator base 73, a damper base 75 connected to the actuator base 73, and suspension wires 77. An objective lens 15 is mounted on the lens holder 71.

Figure 6A:
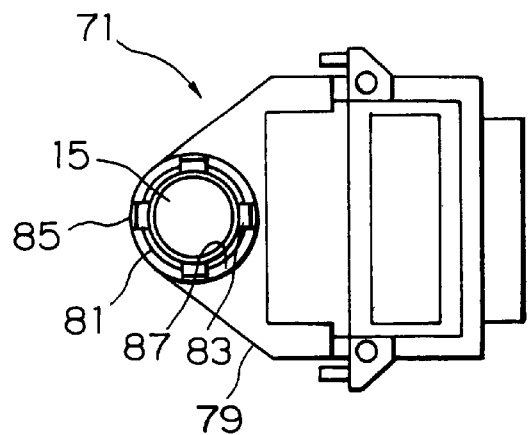
FIG. 6A is a plan view of a lens holder shown in FIG. 5.
Figure 6B:
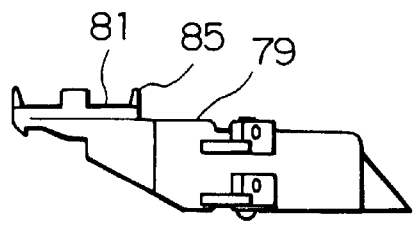
FIG. 6B is a side elevation view of the optical pick up shown in FIG. 5, but in which the lens holder has been removed.

Referring next to FIGS. 6A and 6B, the lens holder 71 has a support portion 79 at one end. A seat portion 81 protrudes cylindrically from the support portion 79. The seat portion 81 is formed with crisscross grooves 83 extending diametrically. Claws 85 protrude upward from the top ends of the grooves 83, and are used to place and lock the objective lens in position.

Figure 6C:
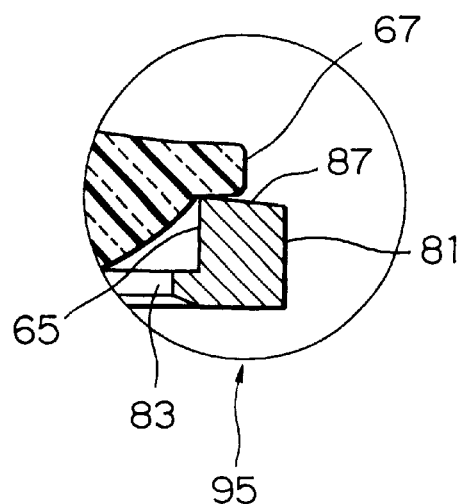
FIG. 6C is a fragmentary enlarged cross section of a bonded portion of a lens shown in FIG. 6A.

As best shown in FIG. 6C, the seat portion 81 has a top-end surface 87 on which the periphery of the objective lens 15 is placed. This top-end surface 87 is inclined mildly outwardly.

Figure 7:
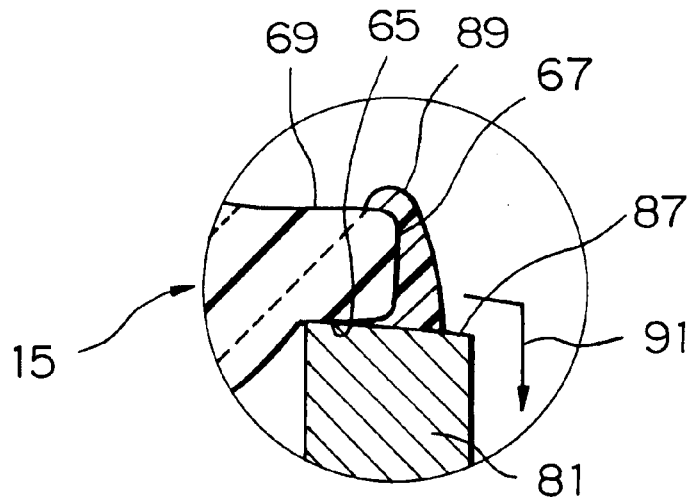
FIG. 7 is a fragmentary cross sectional view illustrating the action of the lens holder shown in FIG. 6A.
Figure 8:
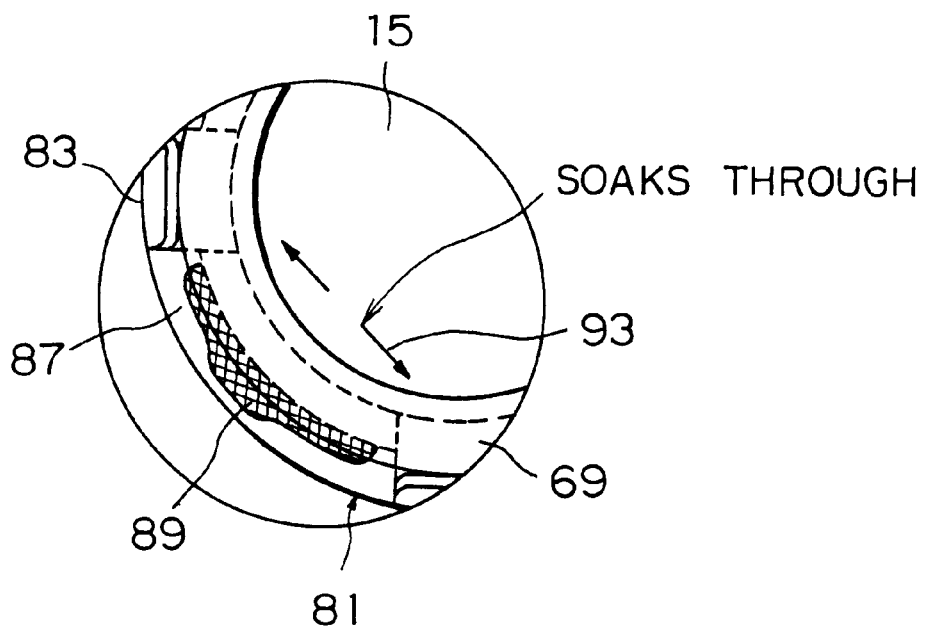
FIG. 8 is a fragmentary plan view illustrating the action of the lens holder shown in FIG. 6A.

The action and advantages of this lens holder 71 in accordance with one embodiment of the invention are next described by referring to FIGS. 7 and 8.

Referring to FIG. 7, a surface of the objective lens 15 used for adhesive bonding normally consists of the top-end surface 87 of the seat portion 81 of the lens holder 71 and the outer surface 67 of the objective lens 15. A slight gap is created between the bottom surface 65 of the peripheral portion of the objective lens 15 and the inclined top-end surface 87, whereby the bottom surface acts as an adhesive surface. By tilting the top-end surface 87 of the seat portion 81, an extra portion of adhesive 89 flows along the downwardly inclined surface of the top-end surface 87 toward the outer periphery of the objective lens 15 as indicated by an arrow 91 without leaking toward the center of the objective lens 15.

In the lens holder 71 of the construction as described above, the applied adhesive 89 spreads over the whole gap between the objective lens 15 and the seat portion 81 of the lens holder 71 by capillarity as indicated by the arrow 93 in FIG. 8. Consequently, the adhesive 89 permeates the whole outer surface of the objective lens, thus enhancing the adhesion. As a result, stronger surface adhesion is possible.

As described thus far, the present invention prevents extra adhesive 89 on the seat portion 81 of the objective lens 15 of the lens holder 71 from leaking toward the center of the objective lens 15; otherwise, the effective range of the objective lens 15 would be contaminated. Furthermore, the adhesive 89 permeates uniformly the gap between the objective lens 15 and the lens holder 71. Hence, the lens holder 71 capable of stronger adhesive bonding and an optical pick up using this lens holder can be provided.

What is claimed is:

1. An optical pick up comprising:
   a lens holder on which an objective lens is held,
   an actuator base, a damper base connected to the actuator base, and suspension wires, wherein said lens holder includes a seat portion for locking said objective lens, said seat portion having a top-end surface, an inclined surface is formed in said top-end surface of said seat portion and sinking outward, and wherein adhesive fills between an outer surface of the objective lens and said inclined surface to lock said objective lens to said seat portion.

2. The optical pick up of claim 1, wherein said adhesive consists essentially of a UV-curable resin.

3. The optical pick up of claim 1 wherein said adhesive comprises a UV-curable resin.

4. A lens holder comprising:

a seat portion for locking an objective lens of an optical pick up, said seat portion having a top-end surface that is an inclined surface sinking outward, wherein adhesive fills between an outer surface of said objective lens and said inclined surface to lock said objective lens to said seat portion.

5. The lens holder of claim 4, wherein said adhesive consists essentially of a UV-curable resin.

6. The lens holder of claim 4 wherein said adhesive comprises a UV-curable resin.

* * * * *